(No Model.)
J. M. T. DAUDELIN.
CAR BRAKE.
No. 322,585. Patented July 21, 1885.
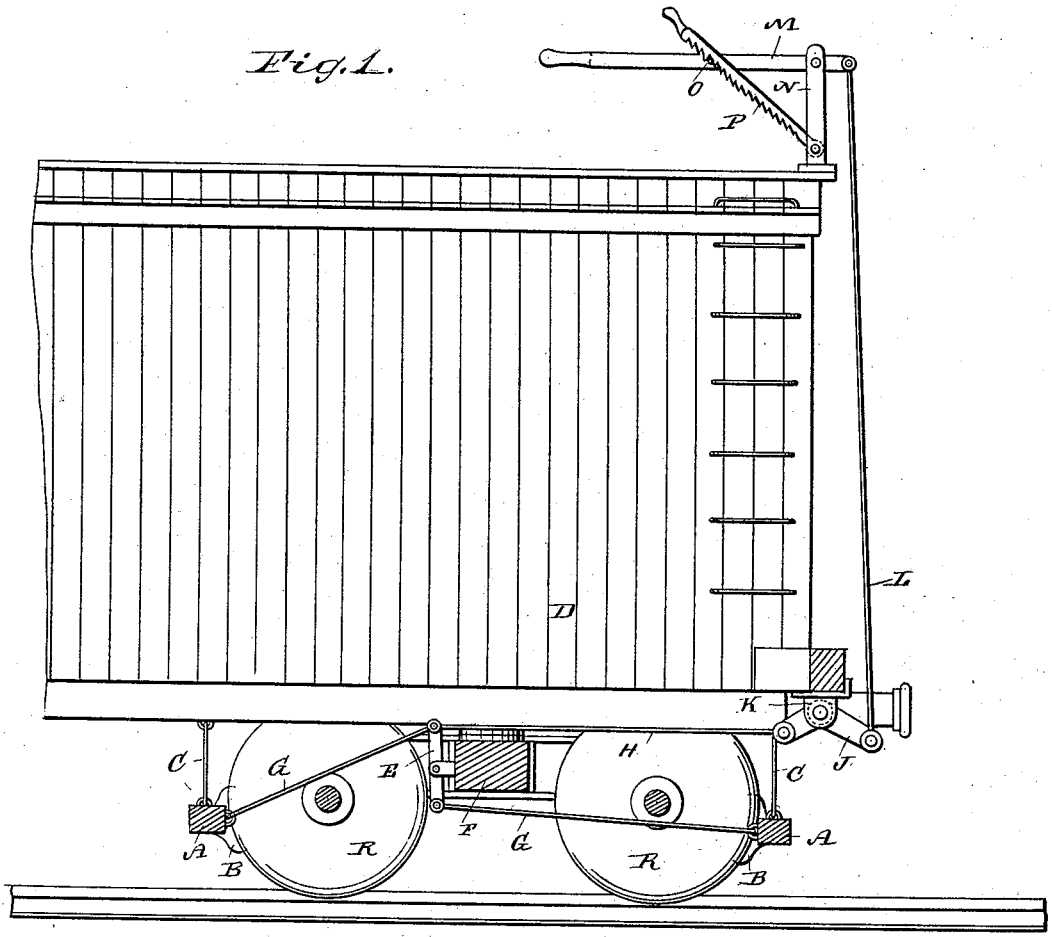
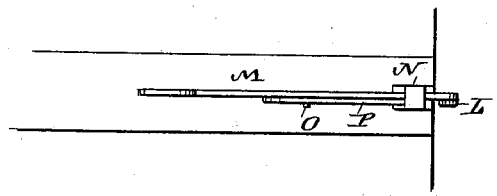
WITNESSES:
Theo. G. Hoster
C. Sedgwick
INVENTOR:
J. M. T. Daudelin
BY Munn & Co
ATTORNEYS.

UNITED STATES PATENT OFFICE.

JOSEPH M. T. DAUDELIN, OF JEFFERSON, TEXAS.

CAR-BRAKE.

SPECIFICATION forming part of Letters Patent No. 322,585, dated July 21, 1885.

Application filed May 26, 1885. (No model.)

*To all whom it may concern:*

Be it known that I, JOSEPH M. T. DAUDELIN, of Jefferson, in the county of Marion and State of Texas, have invented a new and Improved Car-Brake, of which the following is a full, clear, and exact description.

The object of my invention is to provide a new and improved car-brake which is simple in construction and effective in use.

The invention consists in the combination, with the brake, of an angle-lever on the end part of the car, a draw-head on the car, a lever pivoted on the same, a rod connecting the said lever with the angle-lever, a toothed locking-bar on the standard, and a pin on the lever on the standard, all as will be fully set forth and described hereinafter.

Reference is to be had to the accompanying drawings, forming a part of this specification, in which similar letters of reference indicate corresponding parts in both the figures.

Figure 1 is a side view of the end part of a car provided with my improved car-brake. Fig. 2 is a plan view of the levers on the top of the car.

The bars A, carrying the brake-shoes B, are suspended by rods C from the under side of the car D.

A lever, E, is pivoted on the middle truck-beam, F, and the ends of the same are connected by rods G with the front and rear brake-bars, A. The upper end of the lever E is connected by a rod, H, with one end of an elbow-lever, J, pivoted at its angle to lugs K, held on the under side of the end beam of the car. The other or outer end of the elbow-lever J is connected by a rod, L, with the outer shorter end of a lever, M, pivoted on a standard, N, on the roof of the car at the end. From the side of the long part of the lever M a pin, O, projects, which can engage with teeth on the bottom edge of a toothed bar, P, pivoted on the lower part of the standard N.

By pressing down the long inner end of the lever M the rod L is pulled upward and the front end of the lever J is pulled upward, whereby the upper end of the lever E is moved to the front, and the brake-shoes are pressed against the wheels R. As the lever M is pressed downward, the pin O slides under the teeth of the bar, and whenever the lever M is released it engages with any one of said teeth and locks the lever M and the brake-shoes in place.

To release the brake, the lever M is depressed and the lever P is raised, and then the lever M swings upward.

Having thus described my invention, I claim as new and desire to secure by Letters Patent—

1. The combination, with a car, of an elbow-lever pivoted on the end of the car at the bottom, a lever pivoted on a standard on the roof of the car, a rod connecting the said lever with the elbow-lever on the bottom of the car, a rod for connecting the said elbow-lever with the brake, a toothed bar pivoted on the standard on the roof, and a pin projecting from the side of the lever pivoted on the standard, substantially as herein shown and described.

2. The combination, with a car, of a lever, E, pivoted on the truck, rods G, connecting the ends of the lever with the brake-bars A, the elbow-lever J, the rod H, connecting the upper end of the lever E with the inner end of the lever J, the standard N on the roof of the car, the lever M, pivoted on the same, the rod L, connecting the levers M and J, the pin O on the lever M, and the toothed bar P, pivoted to the standard N, substantially as herein shown and described.

JOSEPH M. T. DAUDELIN.

Witnesses:
W. W. WEST,
W. E. ESTES.